Patented June 4, 1946

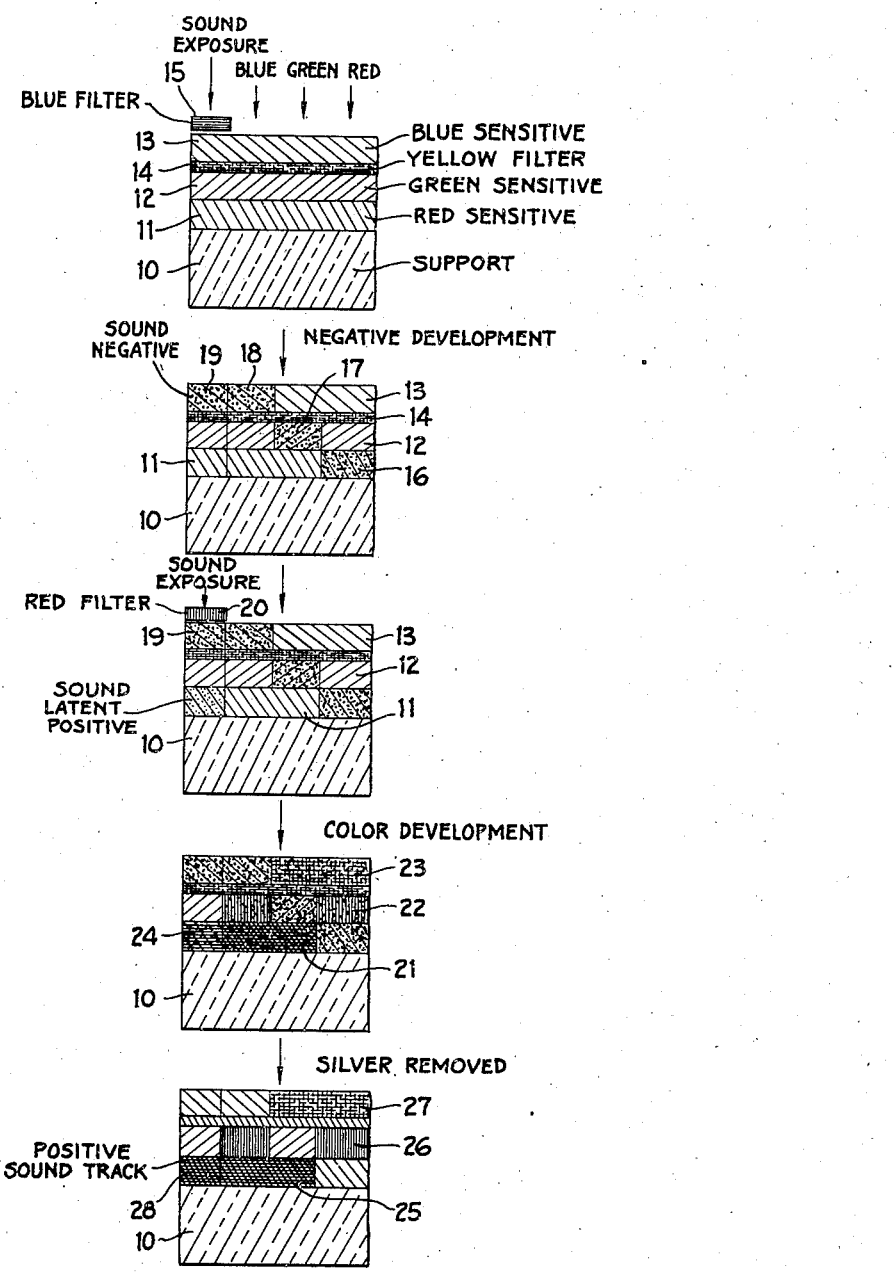

2,401,699

UNITED STATES PATENT OFFICE 2,401,699

SOUND IMAGE IN MULTILAYER FILM

Leopold D. Mannes, New York, N. Y., assignor to Eastman Kodak Company, Rochester, N. Y., a corporation of New Jersey Application December 22, 1944, Serial No. 569,379

3 Claims. (Cl. 95—2)

This invention relates to photographic color films having sound tracks thereon and particularly to a method for producing sound records on such films.

It is well known that a positive sound track printed from a negative is capable of producing notably better sound reproduction than a track which is made by a photographic reversal. In multilayer color films it has hitherto been necessary, in the case of sound films made in the camera, to utilize a reversal sound track. This places a severe limitation on the quality of the sound produced.

It is, therefore, the principal object of the present invention to provide a method for producing a negative-positive sound track in a multilayer film which is processed by reversal. Other objects will appear from the following description of my invention. These objects are accomplished by printing or recording a negative sound track in a limited stratum of a multilayer film and printing a positive from the negative in another limited stratum of the same film. For example, a silver negative sound track is produced in one or more layers of a multilayer film, and this silver negative is used to print a positive in another layer or layers of the film. The positive sound image will in the simplest application of this method be processed in color by means of coupler developers which are ordinarily used for producing the positive or reversed picture image.

The accompanying drawing is a flow chart showing in sectional form the film at various stages in my process.

A multilayer film which is processed by reversal is described in Mannes, Godowsky and Wilder U. S. Patent 2,252,718, granted August 19, 1941, and my process may be applied to a film of this type. The multilayer film shown in the Mannes, Godowsky and Wilder patent has three superposed light-sensitive layers sensitive respectively to the red, green, and blue spectral regions, the blue-sensitive layer being outermost or farthest from the support. After exposure and negative development of this film, the emulsion layers are separately exposed and color-developed to produce reversed dye images of the proper color in the separate layers. The metallic silver and coloring material of the yellow filter layer are removed as a final step.

According to the present invention, the sound track is exposed in the camera or is printed from a positive by means of a blue filter placed over the exposing light. This confines the sound track exposure substantially to the top or blue-sensitive layer of the film. When the film is processed, a negative sound track will be produced by the regular first negative developer. Following negative development, the sound track area only is exposed through the top layer with light to which the bottom layer or layers are sensitive but the top layer is insensitive. This prints the sound track image into the bottom layer or layers and produces a latent positive image of the sound track in these layers. The film then continues through its regular processing for the production of reversed images in the picture area of the film by selective reexposure and color development of the picture areas. This produces a cyan positive sound track in the bottom layer, if the bottom layer is colored cyan as is customary.

If the middle layer of the film was exposed in printing the sound track from the top layer and if the middle layer is exposed to light to produce a picture image therein, a magenta positive image of the sound track will be added to the cyan image, provided that the middle layer is colored magenta as is customary. If a fogging developer is used for the middle layer instead of a light exposure, a uniform magenta density will be deposited in the sound track area. This reduces the modulation of the sound image and it may, therefore, be desirable to avoid the use of a fogging developer for color developing the emulsion layers.

By using a photocell in the projector which has its peak sensitivity in the blue spectral region, it would be practicable to use a yellow coupler developer for development of the positive sound track image in the bottom layer. This, however, necessitates separate exposure and development of the sound track area.

In order to obtain the best possible resolution, it may be necessary to dry the film before making the printing exposure for the sound track. My invention will now be described by reference to the accompanying drawing.

As shown in the first stage, a multilayer film having a support 10 of any suitable material, such as cellulose nitrate or cellulose acetate has coated thereon gelatino-silver halide emulsion layers 11, 12 and 13, sensitive respectively to the red, green, and blue spectral regions. The usual yellow filter layer 14 is coated by the emulsion layers 12 and 13 to prevent action of blue light on an underlying emulsion layer.

This film is exposed in the camera to a natural scene or object, the exposing light being represented by the arrows labelled "blue," "green," and "red." At the same time, the sound track area of the film is exposed through a blue filter 15 to limit the exposure to the outer emulsion layer 13.

After negative development of this film as shown in the second stage of the drawing, the emulsion layers contain negative picture images 16, 17, and 18 in emulsion layers 11, 12, and 13 respectively and negative sound image 19 in layer 13. The sound area is then exposed through a red filter 20 as shown in the third stage of the drawing to print the negative sound image 19 onto the bottom emulsion layer 11 where it exists as a latent positive image. Since a red filter was used in printing the sound track area, the latent image exists only in the bottom layer 11. If a yellow filter were used in place of the filter 20, the positive sound image would exist both in the bottom layer 11 and in the middle layer 12.

The film is then subjected to color development as shown in the fourth stage of the drawing to produce colored positive images in the various emulsion layers. A silver and cyan dye image 21 is produced in the bottom layer, a silver and magenta dye image 22 is produced in the middle layer and a silver and yellow dye image 23 is produced in the top emulsion layer. At the same time, the silver and cyan positive sound track image 24 is produced in the bottom layer. These dye images are produced by selective exposure and color development of the emulsion layers. For example, the bottom layer may first be exposed with red light in the picture area and the film then subjected to a cyan color developer which produces the cyan images 21 and 24. The top layer may next be exposed with blue light and the yellow dye image 23 produced in this layer by color development. The middle layer may then be exposed with green or white light from either side and the magenta dye image 22 formed in it by color development. This leaves silver and dye images, as well as the originally developed silver images, in the film. The yellow filter material also remains in the film at this stage.

The silver images are then removed to leave dye images 25, 26 and 27, colored cyan, magenta and yellow respectively in the picture areas and cyan positive sound track 28 in the sound track area. The silver and yellow filter material are removed, so that a pure cyan dye positive sound track is left in the sound track area of the film.

The process which I have described is illustrative only and numerous variations will be apparent to those skilled in the art. For example, the order of the layers need not be the same as that described above but the red- and green-sensitive layers may be reversed, the green-sensitive layer being coated adjacent the support. It is also possible to coat the blue-sensitive layer adjacent the support and the red- and green-sensitive layers on top of it. In this case, the exposure is made through the support and the yellow filter layer is then coated between the blue-sensitive layer and the remaining sensitive layers. It is also possible to vary the order of exposure of the layers, in reversing them. The blue-sensitive layer may be exposed and developed first or before the green- or red-sensitive layers. The coupler compounds need not be in the developer solution but may be contained in one or more of the sensitive layers in the form of non-diffusing compounds which couple with the development product of the primary aromatic amino developing agent upon development.

Numerous other modifications may be made within the scope of my invention which is to be understood as comprising all features falling within the scope of the appended claims.

I claim:

1. The method of producing a positive sound track in a multi-layer photographic film having emulsion layers sensitive respectively to different regions of the visible spectrum of which an area is suitable for sound track recording and another area is suitable for picture recording, which comprises forming by exposure and development of the top layer sound track area and the picture area of all layers a negative sound image in the top layer only and negative picture images in the picture areas, exposing the sound track area only, with uniform light to which at least the bottom layer is sensitive but the top layer is insensitive to print the sound image in the top layer onto at least the bottom layer, producing positive picture images in the picture areas by selectively exposing the layers containing said negative images to light of a color to which each is sensitive and color developing them, developing said exposed sound track area of the bottom layer to form a positive dye sound track in the bottom layer at the same time and with the same developer as used for development of a picture image in said layer, and removing all developed silver and unexposed silver halide from the film.

2. The method of producing a positive sound track from a negative in a multi-layer photographic film having superposed layers effectively sensitive to blue, green and red light in which picture images are produced by reversal in one area and a sound track is recorded in another area, which comprises forming by exposure and development of the top layer sound track area and the picture area of all layers a negative sound image in the top layer only, and negative picture images in the picture areas, exposing the sound track area only with uniform red light to which the bottom layer only is sensitive to print the sound image in the top layer onto the bottom layer, producing picture images in the picture areas by selectively exposing the layer containing said negative images to light of a color to which each is sensitive and color developing them, developing said exposed sound track area of the bottom layer to form a positive dye sound track in the bottom layer at the same time and with the same developer as used for development of a picture image in said layer and removing all developed silver and unexposed silver halide from the film.

3. The method of producing a positive sound track in a photographic film having superposed strata sensitive, respectively, to different regions of the visible spectrum, of which an area is suitable for sound track recording and another area is suitable for picture recording, which comprises forming by exposure and development of the sound track area of one stratum and the picture area of all strata, a negative sound image in said one stratum only and negative picture images in the picture areas, exposing the sound track area only, through the sound image with uniform light to which at least one stratum other than that in which the sound image is located is sensitive, but the stratum containing the sound image is insensitive, to print the sound image in said one stratum onto at least another stratum, producing positive picture images in the picture area by selectively exposing the strata containing said negative images to light of a color to which each stratum is sensitive and color developing them, developing said exposed sound track area of said other stratum to form a positive dye sound track in said other stratum at the same time and with the same developer as used for the development of a picture image in said stratum and removing all silver and undeveloped silver halide from the film.

LEOPOLD D. MANNES.